(12) United States Patent
Rentzepis et al.

(10) Patent No.: US 11,879,777 B2
(45) Date of Patent: Jan. 23, 2024

(54) CELLPHONE-BASED RAMAN SPECTROMETER SYSTEM FOR THE DETECTION AND IDENTIFICATION OF CHEMICAL AND BIOLOGICAL MOLECULES

(71) Applicant: The Texas A&M University System, College Station, TX (US)

(72) Inventors: Peter M. Rentzepis, College Station, TX (US); Dinesh Dhankhar, Beaverton, OR (US); Anushka Nagpal, Hillsboro, OR (US)

(73) Assignee: The Texas A&M University System, College Station, TX (US)

(*) Notice: Subject to any disclaimer, the term of this patent is extended or adjusted under 35 U.S.C. 154(b) by 0 days.

(21) Appl. No.: 17/810,477

(22) Filed: Jul. 1, 2022

(65) Prior Publication Data

US 2023/0003577 A1    Jan. 5, 2023

Related U.S. Application Data

(60) Provisional application No. 63/217,530, filed on Jul. 1, 2021.

(51) Int. Cl.
   *G01J 3/02*    (2006.01)
   *G01J 3/44*    (2006.01)
   *G01J 3/28*    (2006.01)

(52) U.S. Cl.
   CPC ........... *G01J 3/0272* (2013.01); *G01J 3/0202* (2013.01); *G01J 3/0208* (2013.01); *G01J 3/0291* (2013.01); *G01J 3/4412* (2013.01); *G01J 2003/2836* (2013.01)

(58) Field of Classification Search
   CPC ...... G01J 3/0291; G01J 3/0272; G01J 3/0202; G01J 3/4412; G01J 3/0208; G01J 2003/2836
   See application file for complete search history.

(56) References Cited

U.S. PATENT DOCUMENTS

| | | | | |
|---|---|---|---|---|
| 3,414,354 | A | * | 12/1968 | Siegler, Jr. ............. G01N 21/65 359/861 |
| 5,506,678 | A | * | 4/1996 | Carlsen .................. G01N 21/51 356/338 |
| 5,786,893 | A | * | 7/1998 | Fink .......................... G01J 3/44 359/885 |
| 7,403,281 | B2 | * | 7/2008 | Carron ...................... G01J 3/44 356/301 |
| 10,488,260 | B1 | * | 11/2019 | Vakhshoori ........... G01J 3/0289 |

(Continued)

OTHER PUBLICATIONS

Su, Sheng-fei "Raman Spectrum Detection System", Jul. 2019 (Year: 2019).*

(Continued)

*Primary Examiner* — Sang H Nguyen
(74) *Attorney, Agent, or Firm* — Schwegman Lundberg & Woessner, P.A.

(57) ABSTRACT

A small, handheld Raman spectrometer device can be built from a laser, lenses, and a diffraction grating configured in a right-angle Raman spectroscopy geometry, and used in conjunction with a cell-phone camera to record the Raman spectra. The cell-phone-based Raman spectrometer system is suited to performing in-situ measurements of chemical and biological molecules.

20 Claims, 12 Drawing Sheets

(56) References Cited

U.S. PATENT DOCUMENTS

| | | | |
|---|---|---|---|
| 2012/0002197 A1* | 1/2012 | Moser | G03H 1/0248 |
| | | | 359/3 |
| 2013/0321799 A1* | 12/2013 | Day | G01J 3/4412 |
| | | | 356/301 |
| 2014/0022532 A1* | 1/2014 | Sackett | G01N 21/359 |
| | | | 356/51 |
| 2021/0072158 A1* | 3/2021 | Ilchenko | G01J 3/0229 |
| 2021/0231499 A1* | 7/2021 | Vohra | G01J 3/10 |

OTHER PUBLICATIONS

Cai et al "A Handheld Laser Raman Spectroscopy System", May 2018 (Year: 2018).*

Dhankhar, Dinesh, et al., "Cell-phone camera Raman spectrometer", Rev. Sci. Instrum. 92, 054101, (May 4, 2021), 8 pgs.

* cited by examiner

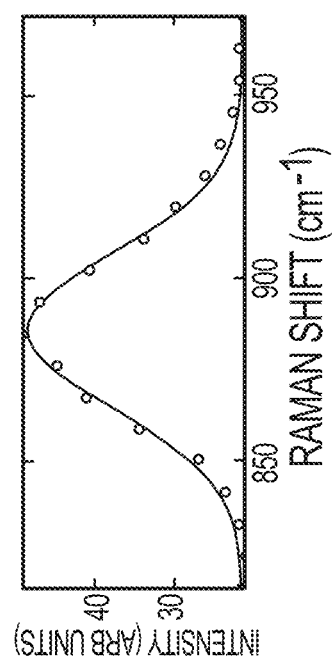
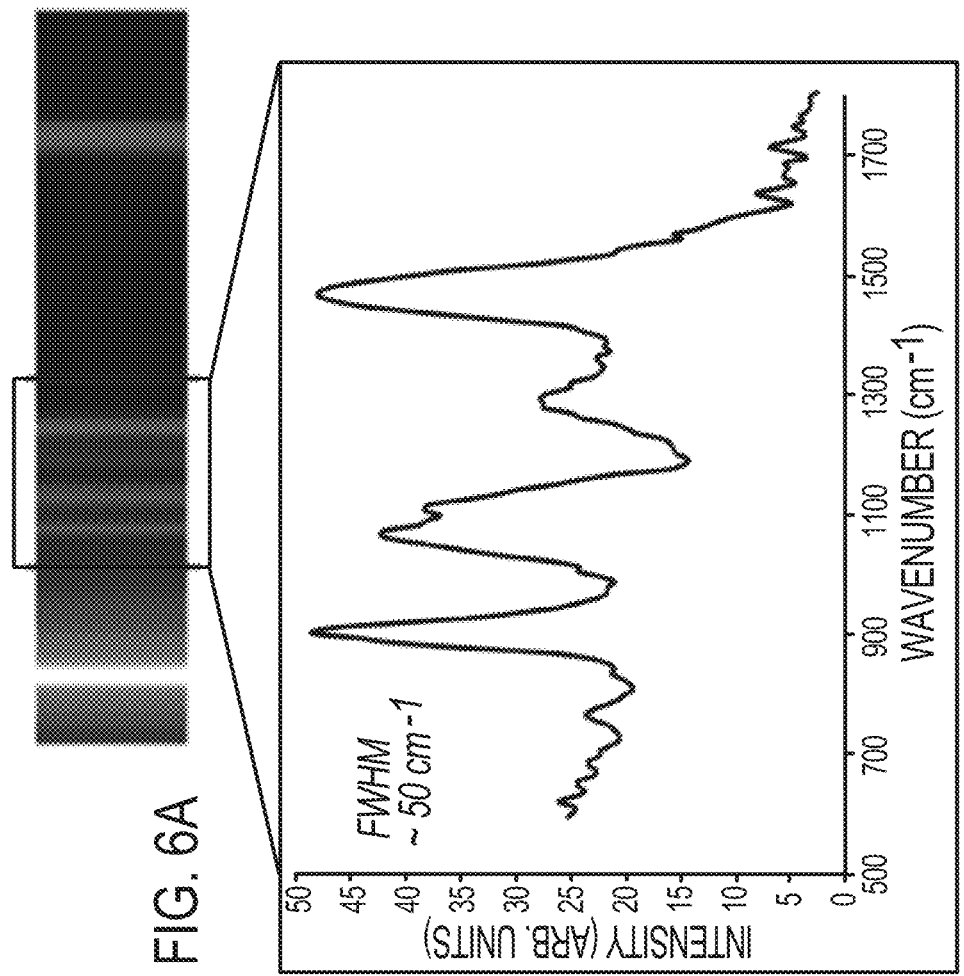
FIG. 6A
FIG. 6B
FIG. 6C

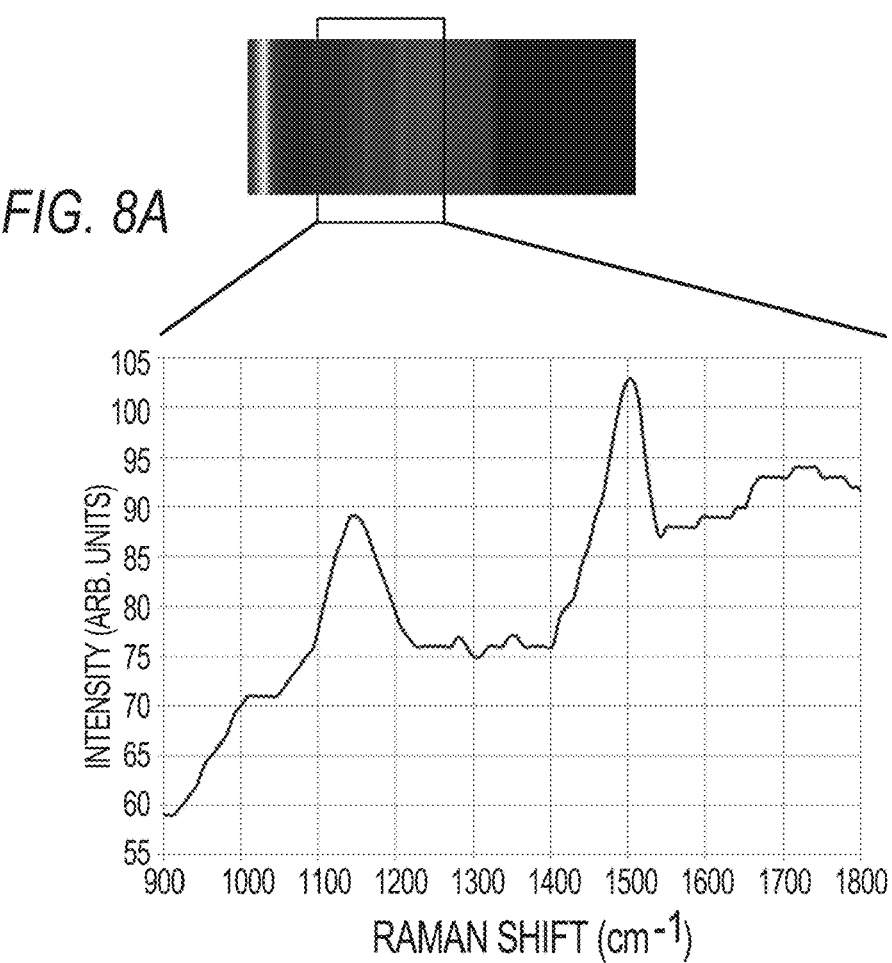
FIG. 8A
FIG. 8B
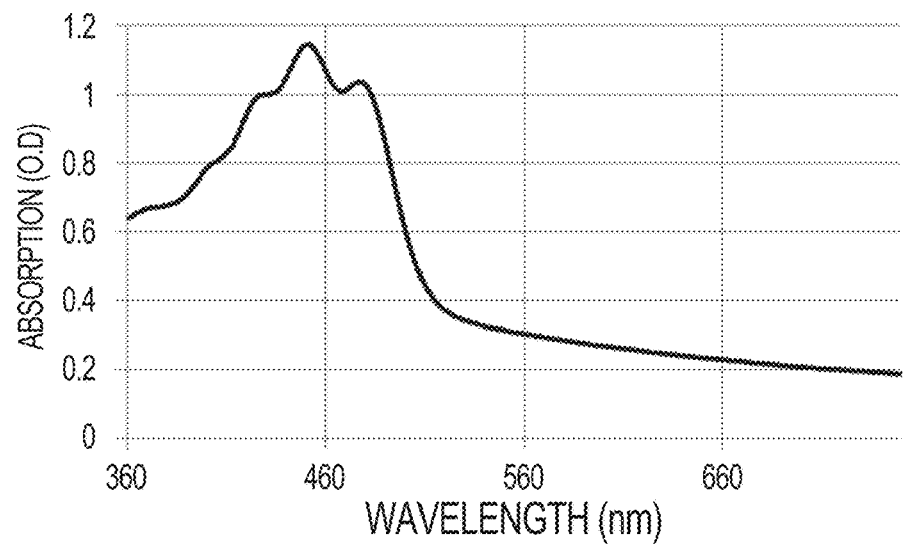
FIG. 8C

CELLPHONE-BASED RAMAN SPECTROMETER SYSTEM FOR THE DETECTION AND IDENTIFICATION OF CHEMICAL AND BIOLOGICAL MOLECULES

CROSS-REFERENCE TO RELATED APPLICATION

This application claims priority to and the benefit of U.S. Provisional Application No. 63/217,530, the entire disclosure of which is hereby incorporated herein by reference.

GOVERNMENT LICENSE RIGHT

This invention was made with government support under Grant FA9550-20-1-0139 awarded by the Air Force Office of Scientific Research (AFOSR). The government has certain rights in this invention.

BACKGROUND

Raman and fluorescence spectroscopy are two powerful techniques for the detection and study of the structure and reaction mechanism of molecules and biological species, such as proteins, amino and nucleic acids, and bacteria or viruses. Based on scattering and emission of light, these techniques can provide a fingerprint of a molecule and its structure fast and non-invasively. Fluorescence spectroscopy is a very sensitive method for detecting small concentrations of molecules, while Raman spectroscopy provides a means for determining the vibrational modes of the molecule under study, and, consequently, the structure of its molecular bonds. A combination of these techniques allows determining the characteristic structure of complex chemical and biological species. Raman spectroscopy may also be utilized for bio-molecules such as DNA and RNA, which either do not fluoresce or emit very low intensity fluorescence. Raman spectroscopy has been utilized for numerous and diverse applications, such as identifying and measuring concentrations of pharmaceutical drugs and other mixtures, identifying harmful gases and chemicals in the environment and industrial plants, determining the content of alcoholic fermentation in yeast and the solid fat content in milk, determining the crystallinity of cellulose, identifying chemical isomers, and measuring species concentrations in cryogenic fuels for the space industry, to name just a few examples.

Raman spectroscopy generally involves the excitation of the molecules in a sample with monochromatic light, usually in the infrared, visible, or ultraviolet regime. Interaction of the light with vibrations or other excitations in the system results in inelastic scattering of the photons, causing a shift in the photon energy. The Raman-scattered light, thus, has wavelengths greater or smaller than the excitation light. Raman spectroscopy has been applied to the detection and identification of biological molecules by excitation with ultraviolet and visible light in order to increase the signal intensity, generating resonance-enhanced Raman spectra.

Several notable attempts have been made to build cost-effective Raman spectrometers; however, these spectrometers still cost several thousands of USD, with the majority designed for laboratory-based experiments rather than for in-field testing.

BRIEF DESCRIPTION OF THE DRAWINGS

Described herein, with reference to the accompanying drawings, are small, handheld, and inexpensive Raman spectrometer devices and systems, suitable for in-situ testing of chemical and biological molecules.

FIGS. 6A and 6B show an example camera image and intensity plot derived therefrom, respectively, of a Raman spectrum of ethanol, as recorded with a cell-phone-based Raman spectrometer system in accordance with one embodiment.

FIG. 6C shows a Gaussian fit to a Raman peak of the Raman spectrum of FIGS. 6A and 6B.

FIGS. 8A and 8B show an example camera image and intensity plot, respectively, of a resonance-enhanced Raman spectrum of carrots, as recorded with a cell-phone-based Raman spectrometer system in accordance with one embodiment.

FIG. 8C shows an example absorption spectrum of carotene.

DESCRIPTION

Figure 1C:
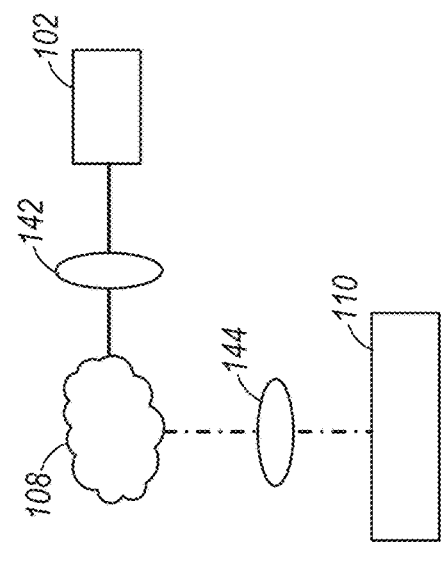
FIGS. 1A-1C are schematic diagrams illustrating backscattered, transmission, and right-angle Raman spectroscopy geometries.

This disclosure provides small (e.g., cell-phone- or pocket-sized), handheld Raman spectrometer devices that utilize a right-angle spectroscopy geometry. In various embodiments, cell-phone camera technology is employed to record the Raman spectra (including, in some examples, resonance-enhanced Raman spectra). The compact cameras in modern-day cell phones are increasingly becoming on par with, or even surpassing, the quality and sensitivity of traditional stand-along camera systems, owing in part to the use of back-illuminated CMOS sensors and advances in noise removal software pre-processing of the captured images. Taking advantage of the improved camera sensitivity and picture quality, a Raman spectrometer system, in example embodiments, may utilize an inexpensive device including an excitation laser and a small number of optical components (e.g., collection optics and a diffraction grating) in conjunction with a cell phone to perform Raman spectroscopy. The cell-phone-based Raman spectrometer system as described herein may provide a resolution suitable for scientific purposes, such as the detection and identification of chemical and biological molecules.

In addition to the camera that serves as the spectroscopic sensor, the cell phone may also provide the computational functionality for processing and analyzing the recorded spectra, e.g., to identify molecules and/or determine their structure or concentration in the sample. For instance, the cell phone may store a software application executed by a cell-phone processor to perform the spectral analysis. Alternatively, the cell phone may transmit the acquired image data from the camera, or spectral data derived therefrom, over a communications network (e.g., a cellular or WiFi network) to a remote computer to perform the analysis, and optionally receive results of the analysis from the remote computer and display them to the cell-phone user.

In some embodiments, the excitation laser, collection optics, and diffraction grating are contained in a housing that provides access for placing a sample at a sample location within the optical path. The housing may also provide an opening, at a desired sensor location, against which the cell-phone camera can be placed, and optionally a cell-phone holder (e.g., a clamp, bracket, or the like) that holds the cell phone in place. Alternatively to being provided in a separate device retrofitted to the cell phone, the excitation laser, collection optics, and diffraction optics may be integrated directly into the cell phone. Of course, it is also possible to construct the Raman spectrometer using, instead of a cell phone as a whole, a separate camera, such as a CCD/CMOS camera (e.g., as commonly used in cell phones). Regardless of whether an actual cell phone is being used as part of the system, Raman spectrometers as described herein may be small, portable devices (e.g., measuring less than ten inches in all dimensions, and possibly less than one or two inches in one dimension), and may be relatively inexpensive compared to standard laboratory Raman spectroscopy apparatus.

Handheld and as such portable Raman spectrometers as disclosed herein facilitate detecting and identifying, and optionally measuring the concentration of, chemical and biological molecules in situ, and typically within minutes. By contrast, using conventional (e.g., benchtop-sized) laboratory spectroscopy apparatus, sample to be analyzed often needs to be transported to a distant lab for analysis, which requires a long time. The in-situ capabilities of the disclosed portable devices eliminate the transport time, and may provide near-immediate results. In one application, the spectrometer is used for the fast detection of impurities and pathogens (like viruses and bacteria or other microbes) in place, e.g., in a wound or water supply. In some situations, such as during surgery or in medical emergencies, the ability to identify pathogens in situ and within minutes can be vital.

In one aspect, a handheld Raman spectrometer device in accordance with various embodiments includes a laser to emit an excitation beam towards a sample location, collection optics to capture Raman-scattered light from a sample placed at the sample location, a diffraction grating, and a housing containing the laser, collection optics, and diffraction grating. The excitation beam defines a first optical axis, the collection optics defines a second optical axis intersecting the first optical axis (e.g., perpendicularly) at the sample location, and the diffraction grating is positioned on the second optical axis and diffracts the collected light along a third optical axis towards a camera. The device may further include a spectrometer aperture placed on the second optical axis between the collection optics and the diffraction grating; the collection optics may include a collecting lens to collimate the Raman-scattered light and a spectrometer coupling lens to focus the collimated light onto the spectrometer aperture. Additionally, the device may include a collimating lens placed on the second optical axis between the spectrometer aperture and the diffraction grating. The camera may be a cell-phone camera. In some embodiments, the device is retrofitted to a cell phone placed outside the housing and containing the cell-phone camera, and the housing includes an opening along the third axis for exposure of the cell-phone camera to the diffracted light. In other embodiments, the device is a cell phone having the laser, collection optics, diffraction grating, and cell-phone camera integrated therein, the cell phone being encased by the housing and the camera being placed inside the housing. The cell phone may store a software application to process Raman spectra recorded using the cell-phone camera. The sample location may be exterior to the housing. Alternatively, the sample location may be interior to the housing, and the housing may include a port to provide access to the sample location for placement of the sample at the sample location.

In another aspect, a method in accordance with various embodiments involves using a handheld device including a laser, collection optics, and a diffraction grating contained within a housing to illuminate a sample with laser light emitted by the laser along a first direction, capture light Raman-scattered off the sample in a second direction (e.g., perpendicular to the first) with the collection optics, and spectrally disperse and diffract the captured Raman-scattered light along a third direction with the diffraction grating to create a Raman spectrum; and using a cell-phone camera to record the Raman spectrum. The Raman-scattered light may be collimated with a collecting lens and then focused onto a spectrometer aperture with a spectrometer coupling lens. The handheld device may be a cell phone including the cell-phone camera. Alternatively, a cell phone may be retrofitted with the handheld device to place the cell-phone camera at an opening in the housing formed along the third direction to thereby expose the camera to the diffracted light. The sample may be placed inside the housing at the intersection between the first and second directions. Alternatively, the handheld device may be positioned relative to the sample such that the sample is located at the intersection between the first and second directions. The method may further include analyzing the Raman spectrum to determine Raman scattering wavelengths and identify one or more analytes within the sample based on the Raman scattering wavelengths. The Raman spectrum may be transmitted from the camera over a communications network to a remote computer to perform the analysis. Alternatively, the analysis may be performed on the cell phone containing the cell-phone camera.

The foregoing high-level description will be more readily understood from the following detailed description of the accompanying drawings.

Raman spectrometer systems in accordance herewith employ a right-angle spectroscopy geometry. To illustrate the benefits of this geometry, FIGS. 1A-IC provide, in schematic diagrams, a comparison between various Raman spectroscopy geometries.

Figure 1B:
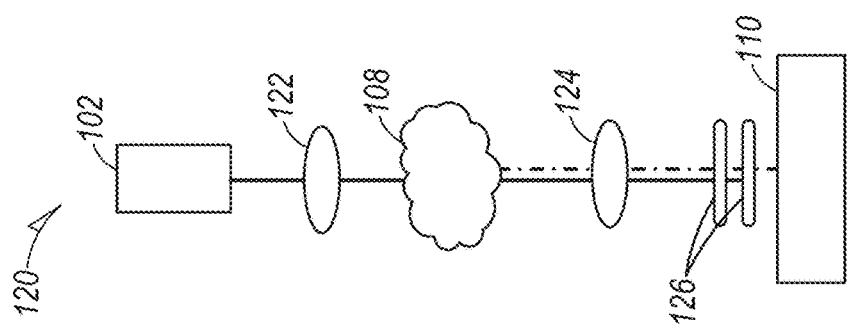
Figure 1A:
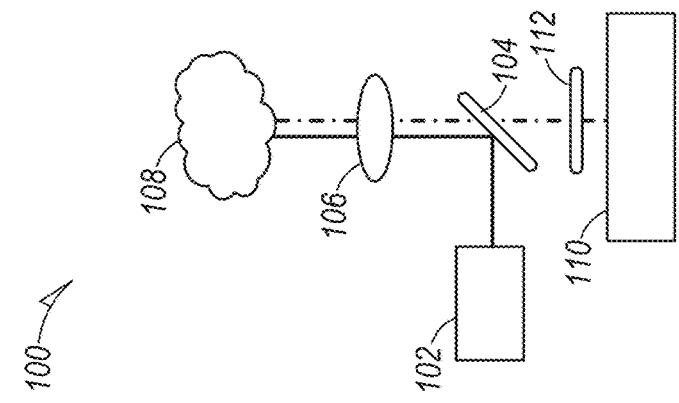

FIG. 1A shows a Raman spectrometer system 100 with backscattered geometry, as is most commonly used. In this configuration, the excitation light from a laser 102 is reflected at a dichroic mirror 104 placed in its path, and focused by a lens 106 onto the sample 108. Raman light emitted in the direction from which the excitation light came, i.e., backscattered light, is transmitted through the lens 106 (which may act to collimate diverging backscattered light) and the dichroic mirror 104 into a spectrometer 110, which includes a dispersive element (e.g., a diffraction grating) and camera to measure the spectrum. While the backscattered geometry results in intense Raman spectra, it tends to suffer from high noise levels imposed by Rayleigh backscattering and back-reflected excitation light. Such noise can be difficult to remove. To eliminate or at least reduce the back-reflected light, dichroic mirrors and one or more expensive Rayleigh rejection filters 112 may be required.

FIG. 1B shows a Raman spectrometer system 120 with transmission geometry. The laser 102 emits the excitation light through a lens 122 directly towards the sample 108, and Raman-scattered light in the transmission direction is passed through a second lens 124 (which may serve to collimate diverging Raman-scattered light) to the spectrometer 110. In this configuration, the dichroic mirrors may be eliminated, but the Raman signal is masked by the intense excitation laser line. Consequently, the transmission Raman spectrometer system 120 generally requires one or more high-quality laser line rejection filters (i.e., Rayleigh rejection filters) 112 and laser cleanup filters 126 to eliminate excitation laser stray modes. One drawback of the Rayleigh rejection filters 112 is that they may also limit the wavelength range in the low Raman-shift regions (e.g., less than 200 cm$^{-1}$), and thus the operating wavelength range of the spectrometer system.

FIG. 1C shows a Raman spectrometer system 140 with right-angle geometry, as used in the embodiments of the instant disclosure. Here, the laser 102 emits the excitation light through a lens 142 directly at the sample 108, as in the transmission geometry, but instead of measuring backscattered light, the spectrometer system 140 is configured to measure light scattered at a 90° angle relative to the direction of the incident excitation light. That scattered light is collected by a lens 144 and focused into the spectrometer 110. Beneficially, the right-angle (90°) configuration reduces the intensity of Rayleigh scattering falling on the detector, resulting in an efficient removal of Rayleigh scattering from the measured spectrum. The right-angle geometry also has the advantage of being easier to use for the measurement of a bulk property (as opposed to a microscopic-level quality) of a sample (such as a liquid or suspension) since the lens 144 in the scattered-light path can collect light from a wider collection area in this configuration. Scattered-light collection over a large area is especially effective when the excitation laser emits an intense collimated beam or a focused beam with a longer depth of focus, thus interrogating a macroscopic volume of the sample, which in turn provides an average Raman spectrum of the sample in the presence of microscopic heterogeneities.

Figure 2:
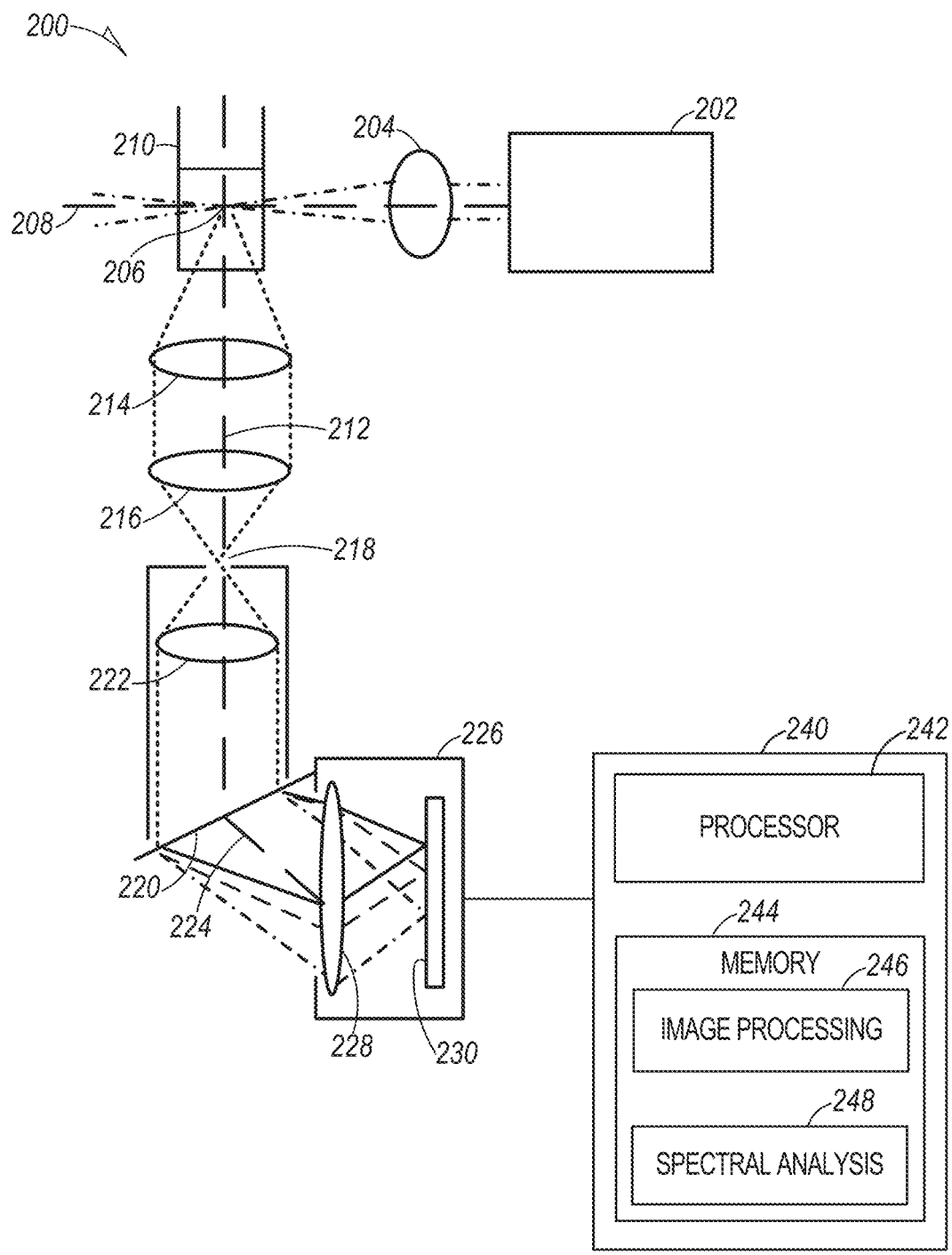
FIG. 2 is a schematic diagram illustrating an example Raman spectrometer system with right-angle geometry, in accordance with an embodiment.

FIG. 2 is a schematic diagram illustrating an example Raman spectrometer system 200 with right-angle geometry, in accordance with an embodiment. The system 200 includes a laser 202 and associated focusing lens 204 that focuses the emitted excitation light from the laser 202 onto a sample location 206. The laser 202 may be, without limitation, a diode laser, e.g., emitting a beam at 532 nm and 50 mW, although diode lasers generating light at different wavelengths and/or with different power may also be used. The lens 204 may have, in one example, a focal length of 10 mm and a diameter of 4 mm. Thus, with the lens 204 placed sufficiently close to the diode laser 202, the laser 202, lens 204, and sample location 206 may fit within a span of an inch. The excitation beam from the laser 202 to the sample location 206 defines a first optical axis 208. In use, a sample, such as, e.g., a liquid sample contained in a cuvette 210, as shown, or a solid sample, is placed at the sample location 206. In some applications, the spectrometer system 200, which may be installed inside a handheld housing, is simply positioned or held such that the sample to be analyzed, which may be, e.g., a wound on a patient, coincides with the sample location 206. With the sample in place, the excitation beam causes Raman scattering in the sample. For liquid samples, scattered light is generally emitted in all directions.

The system 200 further includes collection optics positioned to define a second optical axis 212 that intersects the first optical axis 208 at the sample location 206. The second optical axis 212 is typically perpendicular to the first optical axis 208, as depicted, although non-right angles (e.g., acute angles) between the axes 208, 212 are also possible as long as backscattered and transmission geometries are avoided. As shown, the collection optics may be a two-lens system. A first lens 214 collects and collimates Raman-scattered light emitted towards the lens 214, and a second lens 216 focuses the collected light with a matching f-number (which is the ratio of focal length to aperture of the lens) onto the input slit 218 (or similar input aperture) of a spectrometer. The lenses 214, 216 are herein also called the "collecting lens" and "spectrometer coupling lens," respectively. The spectrometer includes a diffraction grating 220, and optionally a lens 222 located inside the spectrometer that collects light passing through the spectrometer slit 218 and collimates it onto the grating 220. This collimating lens 222 is optional; when used, it increases the intensity of the recorded Raman spectra, but the system 200 may operate effectively even with the collimating lens 222, albeit with lower recorded intensity. In one example, the collimating lens 222 may have a focal length of 60 mm and a diameter of 25 mm.

The grating 220 disperses different wavelength components of the collected Raman-scattered light while diffracting the light generally along a third axis 224 (e.g., at an acute angle with respect to the second axis 212) towards a camera 226. The camera 226 includes an objective lens (or system of lenses) 228 that focuses the light of each wavelength component onto a corresponding spectral line on the image sensor 230 (e.g., a CCD/CMOS sensor). The grating 220 may have, in one example, 1000 lines/mm. As depicted, the grating 220 is a transmission grating, but a reflection grating may, in principle, also be used, with corresponding adjustments to the location of the camera 226.

The image sensor 230, via its associated read-out circuitry, may be connected to suitable processing circuitry 240 for processing the recorded spectral images and analyzing spectral data derived therefrom. The processing circuitry 240 may be implemented in hardware, software, or a combination of both. For example, the processing circuitry 240 may include one or more special-purpose processors, such as a digital signal processor (DSP), application-specific integrated circuit (ASIC), or field-programmable gate array (FPGA), providing the image-processing and analysis functionality. Alternatively, as depicted, the processing circuitry 240 may include a general-purpose processor 242 to execute software programs or applications stored in memory 244. In some embodiments, the stored software includes an image-processing application 246 to derive spectral data (e.g., a spectral intensity profile) from the raw image data (optionally after pre-processing the image(s) to improve signal-to-noise, dynamic range, etc.) and a spectral-analysis application 248 to identify chemical and biological molecules in the sample based on the spectral data, and optionally measure their concentration, excitation states, etc.

Figure 3A:
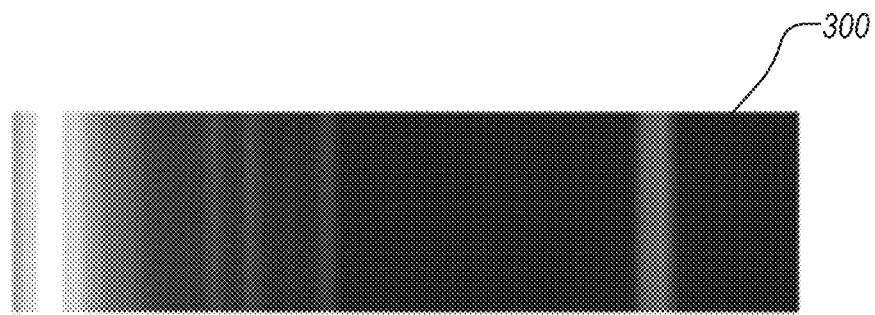
FIGS. 3A and 3B show a camera image and spectral intensity plot, respectively, of an example Raman spectrum acquired with a Raman spectrometer system as depicted in FIG.
Figure 3B:
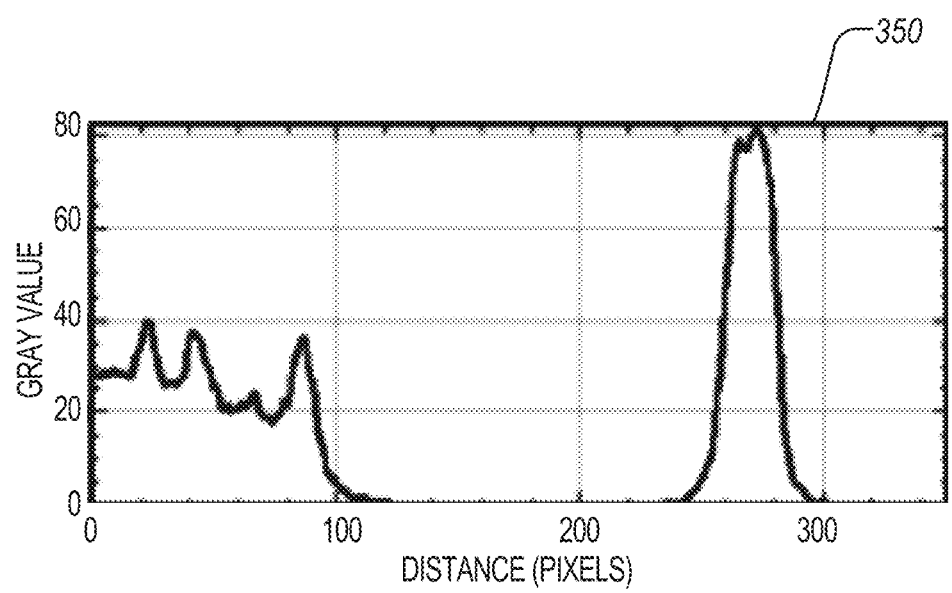

FIG. 3A shows a camera image 300 of an example Raman spectrum acquired with a Raman spectrometer system 200 as depicted in FIG. 2. As can be seen, the image 300 includes distinct spectral lines of varying intensities at various locations in the image, corresponding to different wavelengths of the measured light. FIG. 3B is a graph of the example Raman spectrum of FIG. 3A, shown as a spectral intensity plot 350 derived from the image 300.

The Raman spectrometer system 200 may be implemented using the camera of a standard cell phone (e.g., a Google Pixel™ XL or Google Pixel™ 3a, a Nokia Lumina 1020, or a Motorola Moto G™) to record the Raman spectra. The other optical components, from the laser 202 to the diffraction grating 220, may, in various embodiments, either be integrated directly into the cell phone, or housed together in a separate compact Raman spectrometer device designed for use in conjunction with the cell phone (in other words, "retrofitted" to the cell phone). A low-cost diode laser 202 and simple plastic lenses 204, 214, 216, 222 may be utilized to minimize cost. Suitable optical components are readily commercially available. In some embodiments, the cell phone may also provide the processing circuitry 240, e.g., by storing and running image-processing and spectral-analysis applications 246, 248. In other embodiments, the cell phone transmits the Raman image data, or spectral data derived therefrom, via a wired or wireless connection to a separate computer. For example, the data may be sent through the internet to a remote computer for analysis. As will be appreciated by those of ordinary skill in the art, the Raman spectrometer system 200 can also be implemented without a cell phone, using instead merely a cell phone or other camera, in conjunction with some computing device to provide the processing functionality.

Figure 4B:
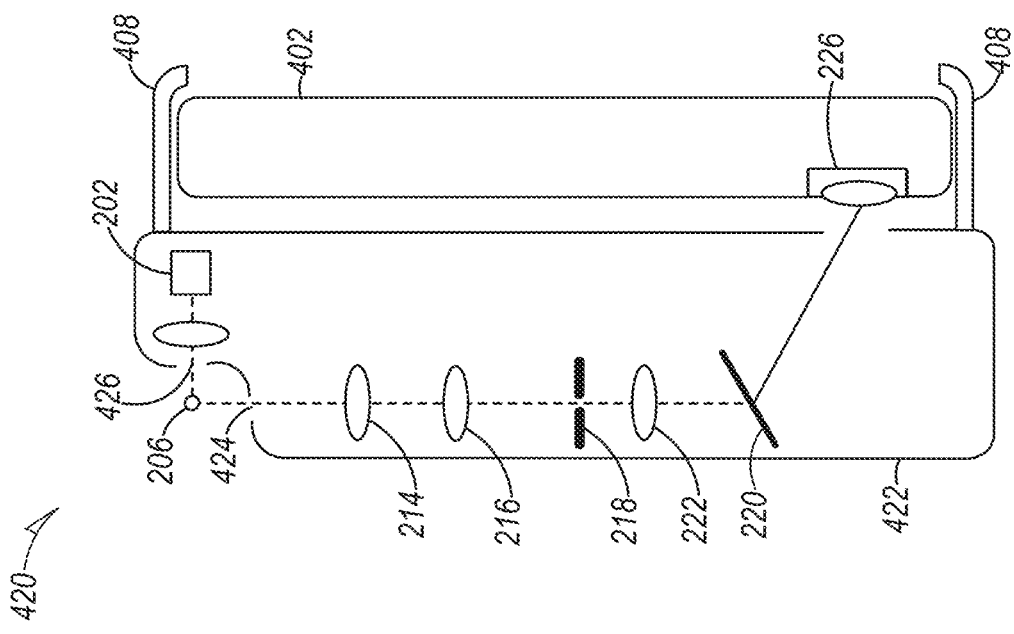
FIGS. 4A and 4B are schematic drawings illustrating example Raman spectrometer devices retrofitted, in accordance with various embodiments, to a cell phone providing the spectrometer camera, with two respective configurations for accessing the sample location.
Figure 4A:
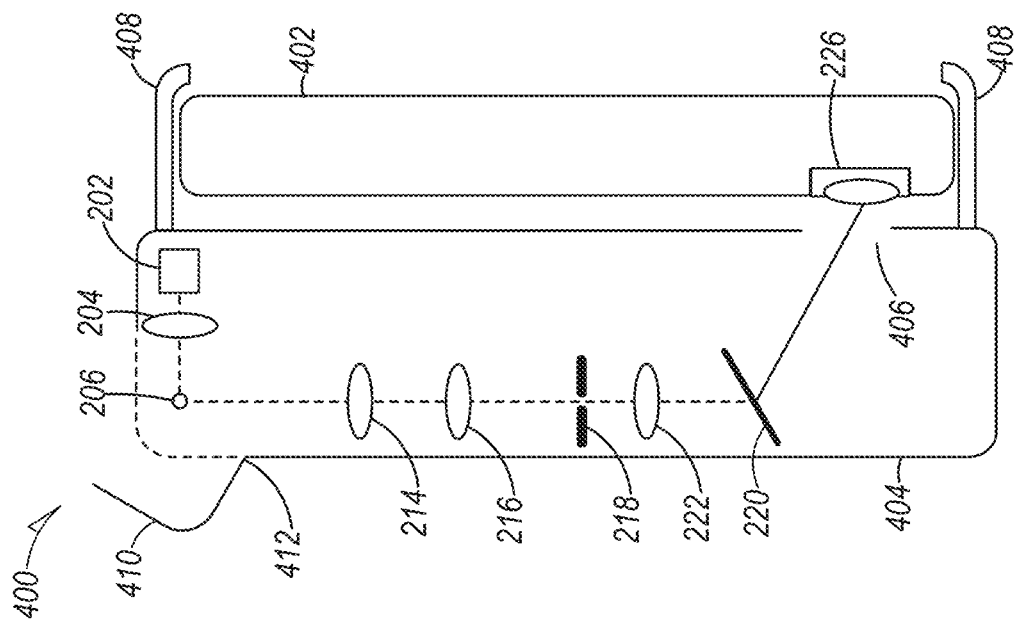

FIGS. 4A and 4B are schematic drawings illustrating example Raman spectrometer devices 400, 420 retrofitted, in accordance with various embodiments, to a cell phone providing the spectrometer camera, with two respective configurations for accessing the sample location. With reference to FIG. 4A, the device 400 contains the laser 202, lenses 204, 214, 216, 222, and spectrometer aperture 218 and grating 220 in a small, compact housing 404, e.g., comparable in size to the cell phone 402. The housing 404 has an opening or window 406 along the third axis 224, corresponding to the direction of the diffracted beam coming from the grating 220. The cell phone 402 is positioned relative to the housing 404 such that its camera 226 aligns with that opening or window 406, allowing the camera 226 to measure the diffracted beam. To maintain the correct relative positioning between the Raman spectrometer device 400 and the cell phone 402, the device 400 may include some means for holding the cell phone 402 in place, e.g., a bracket 408 into which the cell phone 402 can be slotted, or some type of mechanical connector or fastener. The housing 404 of the device 400 may include a port for accessing the sample location in the interior of the device 400 to insert or remove a sample. The port may be implemented, without limitation, by an opening, door, removable cover, or the like. In the depicted example, a corner portion 410 of the housing is pivotable about a hinge joint 412, acting as a door to provide an opening in the housing 404, but many other configurations will occur to those of ordinary skill in the art.

FIG. 4B illustrates a Raman spectrometer device 420 with a different configuration for accessing the sample location 206, but otherwise similar to the device 400 of FIG. 4A. Here, the housing 422 features a recess at a corner where the sample is to be located. In other words, the sample location 206 is outside the device housing 422 in this example. In the area of the recess, the housing includes openings or windows 424, 426 that allow the excitation beam from the laser 202 as well as the Raman-scattered light from the sample to pass through. This configuration of the Raman spectrometer device 420 can be used, for example, to acquire Raman spectra of objects and surfaces that cannot be placed inside the device, such as an open wound, a wall or surface of an apparatus, or the like.

Figure 5:
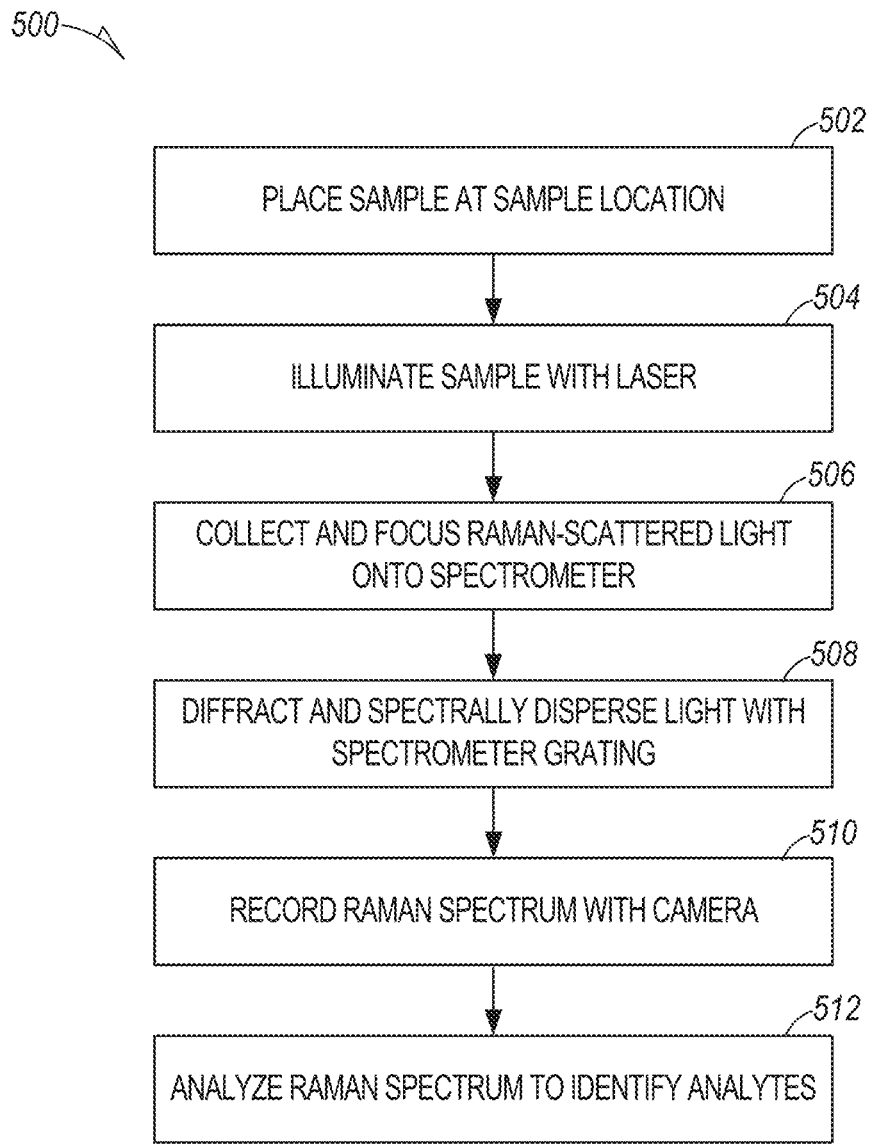
FIG. 5 is a flowchart of an example method of performing Raman spectroscopy with a Raman spectrometer system as depicted in FIG. 2.

FIG. 5 is a flowchart of an example method 500 of performing Raman spectroscopy with a Raman spectrometer system 200 as depicted in FIG. 2. The method 500 involves, in step 502, placing a sample to be measured at the sample location, whether by placing the sample into the spectrometer device (as explained with reference to FIG. 4A) or by holding the device up to the sample (as explained with reference to FIG. 4B). In step 504, the sample is then illuminated with laser light emitted by the laser 202 in a first direction (along the first axis 204), and in step 506, light Raman-scattered along a second, usually perpendicular direction (along the second axis 212) is captured by the collection optics and focused onto the spectrometer. The spectrometer grating spectrally disperses and diffracts the captured Raman-scattered light along a third direction (corresponding to the third axis 224) to create a Raman spectrum in step 508. A camera 226, e.g., a cell-phone camera, is used in step 510 to record the Raman spectrum. In step 512, the Raman spectrum is analyzed, e.g., to determine Raman scattering wavelengths and identify one or more analytes within the sample based on the Raman scattering wavelengths.

Having described example Raman spectrometer devices and systems (in particular, cell-phone based systems) and methods of their operation and use, the disclosure now turns to example data illustrating the Raman spectrometer performance and capabilities in accordance with various embodiments.

This data was acquired using a cell phone placed behind the transmission grating with the camera directly facing the grating. Proper alignment of the camera was ensured by placing a cuvette filled with a dilute solution of Rhodamine 6G dye, as the sample, and recording its intense fluorescence spectrum dispersed by the transmission grating. The Rhodamine 6G solution cuvette was then replaced by a cuvette filled with the sample solution. The Rayleigh-scatted laser excitation light from the solution could be seen with the cell-phone camera through the transmission grating. The autofocus mechanism in the cell-phone camera system was used in order to focus onto this Rayleigh-scattered laser line, and the spectra were acquired in the night-sight mode. The night-side mode provides an exposure time of up to about 180 s by averaging several short exposures. Alternatively, other camera applications in the cell phone, such as the HD camera, were also used. These applications allow for manual focusing, International Organization for Standardization (ISO) sensitivity of the camera, and exposure times up to a few seconds. Depending on the noise in the recorded spectra and lower acquisition times, spectra can be averaged to obtain a higher signal-to-noise ratio (SNR). For example, utilizing the HD camera app on the Google Pixel XL smartphone, the maximum exposure time was limited to 0.7 s. In such a case, twenty spectra were acquired and averaged to improve the SNR.

For the case where a Rayleigh line cutoff filter was employed in the optical path, a highly scattering solution, such as micro-particle suspension, was utilized to detect weak Rayleigh-scattered light through the cell-phone camera, and then the detected light was focused onto the camera system. Once the proper focus was achieved, the micro-particle suspension was replaced with the sample for Raman spectrum acquisition.

During image processing, the recorded spectra were rotated, when necessary, in order to vertically display all the spectral lines. The spectra were binned along the vertical axis, using the median value of all the pixels along the vertical axis to remove noise (salt and pepper noise, hot pixels, and other noise) inherent in the acquired spectra. The resulting one-dimensional spectra (intensity versus wavelength $\lambda$) were scaled in the vertical direction, and the spectral intensity was subsequently plotted versus wavenumber. The pixel-to-Raman-shift wavenumber calibration was performed using the known Raman bands of ethanol. Spectral rotation, binning, scaling, and intensity profile plots were performed using the ImageJ software. Raman spectra were not corrected for the variations of the quantum efficiency (intensity response) of the CMOS sensor as a function of the wavelength (instrument response correction).

The absorption spectra of samples, when required, were recorded using a Shimadzu UV160 spectrophotometer. The carotenes were extracted from the raw carrots in acetone solution. The HD camera app was utilized for recording the Raman spectra in order to determine the ethanol percentage in a water solution. Spectral acquisition time was 3.9 s, the ISO value was 7100, and the manual focusing function was employed to obtain proper focus.

The aperture of the cell-phone camera lens is approximately 2.5 mm. Even when the camera lens is placed directly in front of the grating, 2000 grooves are illuminated (1000 grooves per mm grating), making the resolving power, R value, of the system 2000. The theoretical resolution of the system is, thus, given by $\Delta\lambda = \lambda/R = 0.25$ nm at 500 nm. The cell-phone camera has a 12-megapixel sensor. The dispersion of the spectrum on the sensor was ~0.3 nm per pixel. The resolution of the system is, however, limited by the input slit size, which should not be made too narrow because the amount of light reaching the transmission grating and subsequently the cell-phone camera sensor is very small. Experimentally, the best spectral resolution attained was about 50 cm$^{-1}$ with a 150 μm slit, as can be determined from FIGS. 6A-6C by measuring the "full width at half maximum" (FWHM) of a Gaussian fit to a spectral line.

FIGS. 6A and 6B show an example camera image and intensity plot derived therefrom, respectively, of a Raman spectrum of ethanol, as recorded with a cell-phone-based Raman spectrometer system in accordance with one embodiment. FIG. 6C shows a Gaussian fit to the 885 cm$^{-1}$ Raman peak of the spectrum. ImageJ software was used to make the Gaussian fit, $$y = Ae^{-\frac{(x-c)^2}{2\sigma^2}},$$

and calculate the FWHM according to FWHM=$2\sigma\sqrt{2\ln 2}$=49.67 cm$^{-1}$.

Figure 7A:
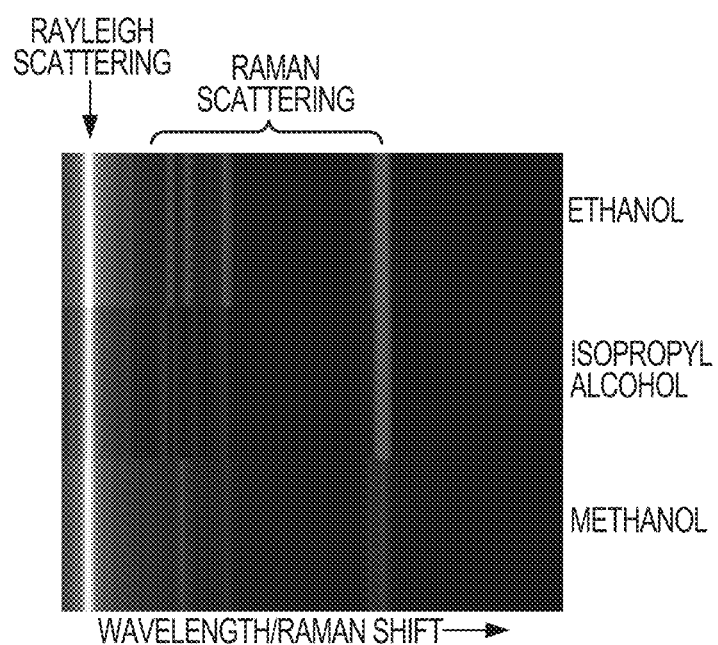
FIG. 7A shows example camera images of Raman spectra of ethanol, isopropyl alcohol, and methanol, as recorded with a cell-phone-based Raman spectrometer system in accordance with one embodiment.
Figure 7B:
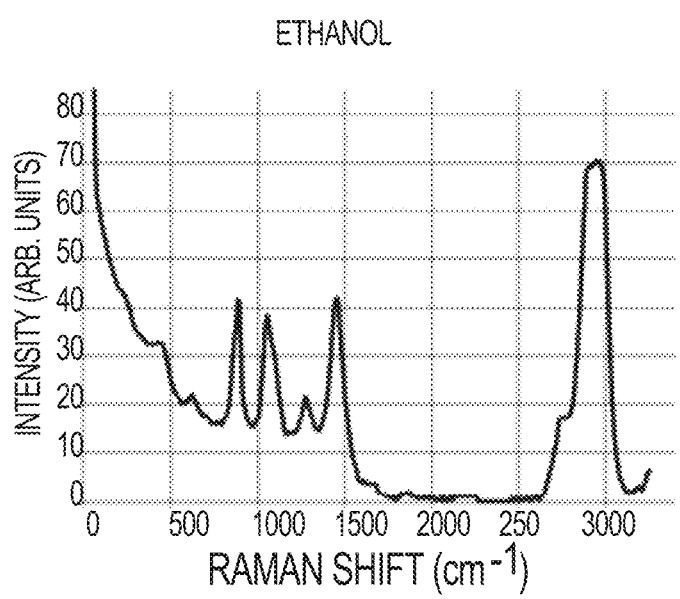
FIGS. 7B-7D show intensity plots derived from the camera images of FIG. 7A.
Figure 7C:
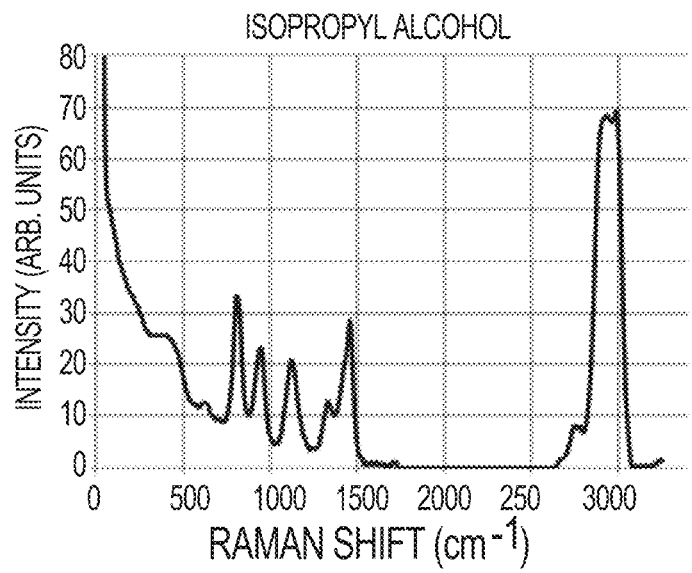
Figure 7D:
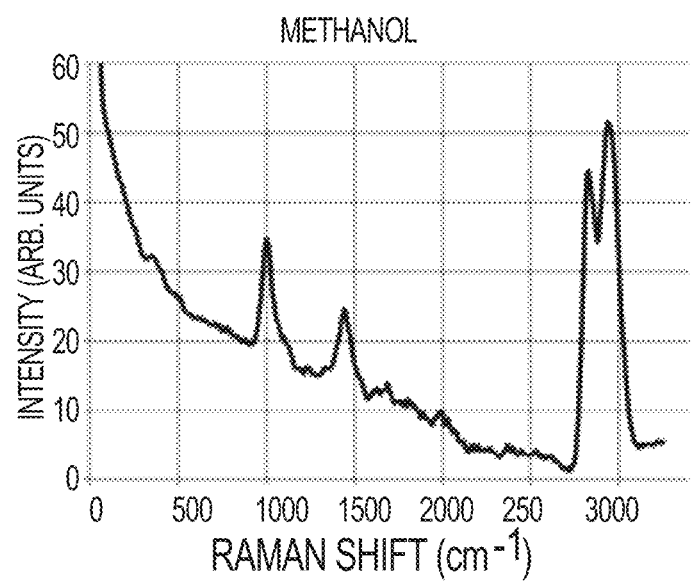

FIG. 7A shows example camera images of Raman spectra of the common solvents ethanol, isopropyl alcohol, and methanol, as recorded with a cell-phone-based Raman spectrometer system in accordance with one embodiment. FIGS. 7B-7D show the processed Raman spectra, that is, the corresponding intensity plots derived for ethanol, isopropyl alcohol, and methanol from the respective camera images of FIG. 7A. For these measurements, the samples were contained in a 1 cm path-length quartz cuvette placed in front of the focused excitation beam, and the spectra were recorded at a right-angle geometry, e.g., as shown in FIG. 2. The recorded Raman spectra are typical for the measured organic molecules.

FIGS. 8A and 8B show an example camera image and intensity plot, respectively, of a resonance-enhanced Raman spectrum of carrots, as recorded with a cell-phone-based Raman spectrometer system in accordance with one embodiment. The carrot Raman spectrum was converted from color to a monochrome image to avoid the intensity artifact on the fluorescence continuum due to transmission variances associated with the RGB Bayer filters used. To measure the Raman spectrum of carrots, the carrot sample was placed at the focal point of the excitation laser beam at a 45° angle relative to the beam so as to direct the scattered Raman radiation toward the collection optics. Carrots contain carotene, which—among several common biological pigments—has an absorption band close to the 532 nm excitation wavelength that was used for recording the Raman spectra, as can be seen in FIG. 8C, which shows a typical absorption spectrum of carotene pigments in carrots. The presence of an absorption band near the excitation wavelength causes the resonance enhancement of the Raman spectral intensities of biological molecules containing the pigment.

Figure 9:
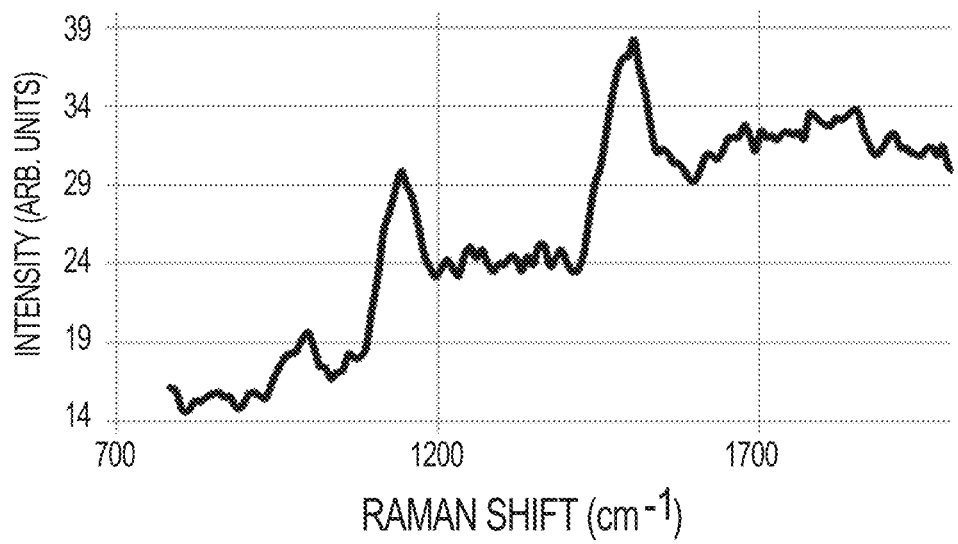
FIG. 9 shows an example intensity plot of a resonance-enhanced Raman spectrum of the bacterium *Serratia marcescens*, as recorded with a cell-phone-based Raman spectrometer system in accordance with one embodiment.

FIG. 9 shows an example intensity plot of a resonance-enhanced Raman spectrum of the bacterium *Serratia marcescens*, as recorded with a cell-phone-based Raman spectrometer system in accordance with one embodiment. Similarly to carrots, this bacterium contains color pigments that absorb in the 532 nm region.

While the above example Raman spectra are one-dimensional (with Raman-scattered intensity varying as a function of wavelength), it is also possible, using the system described herein, to scan the sample (e.g., in the horizontal or vertical direction) and assemble Raman spectral intensity data for multiple positions along the scanning direction into a two-dimensional Raman image.

Figure 10:
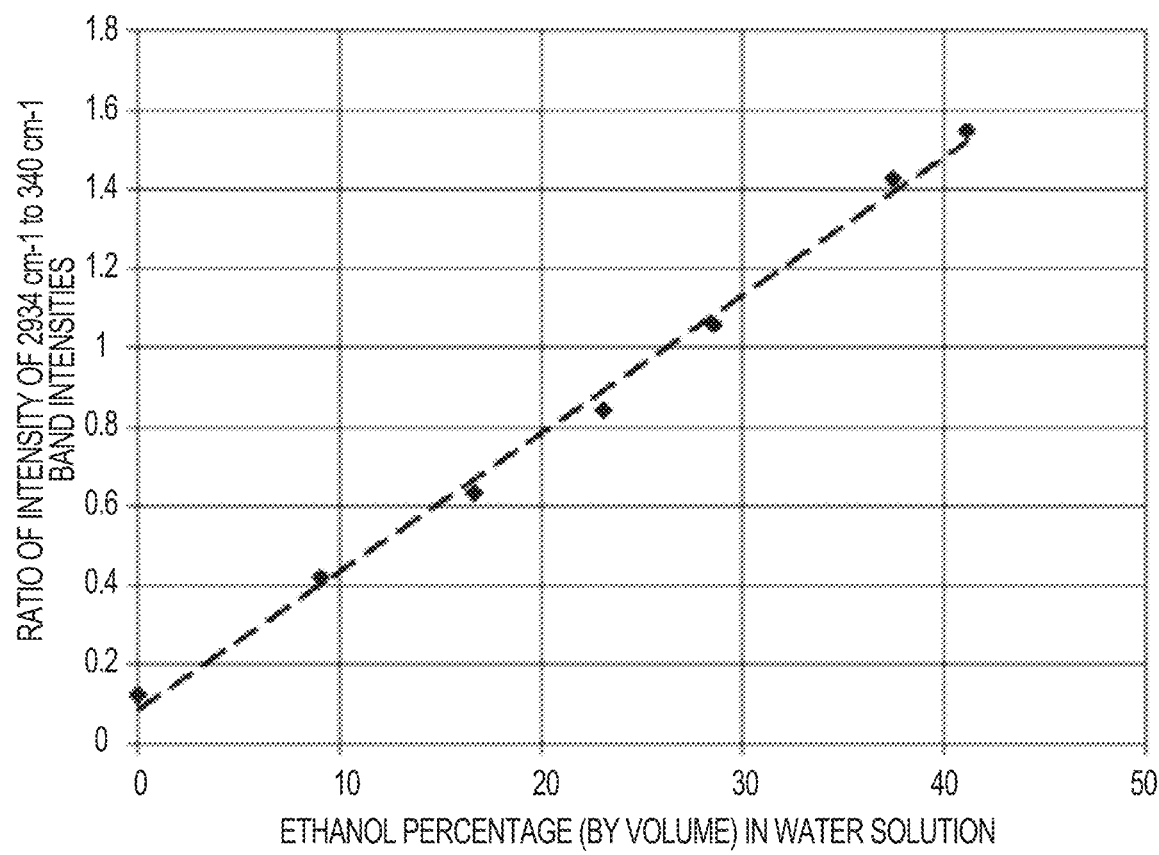
FIG. 10 is a plot of the ratio of the 2950 cm$^{-1}$ Raman band of ethanol to the 3400 cm$^{-1}$ Raman band of water, as measured with a cell-phone-based Raman spectrometer system in accordance with one embodiment, as a function of ethanol percentage in water solution.

FIG. 10 is a plot of the ratio of the 2950 cm$^{-1}$ Raman band of ethanol to the 3400 cm$^{-1}$ Raman band of water, as measured with a cell-phone-based Raman spectrometer system in accordance with one embodiment, as a function of known ethanol percentage in water solution. As expected, the measured Raman band ratio exhibits good linearity with respect to the ethanol concentration, demonstrating the quantitative precision of the Raman spectrometer system. Raman-based concentration measurements are useful, for example, to determine the ratio of active ingredients in consumer products.

Figure 11A:
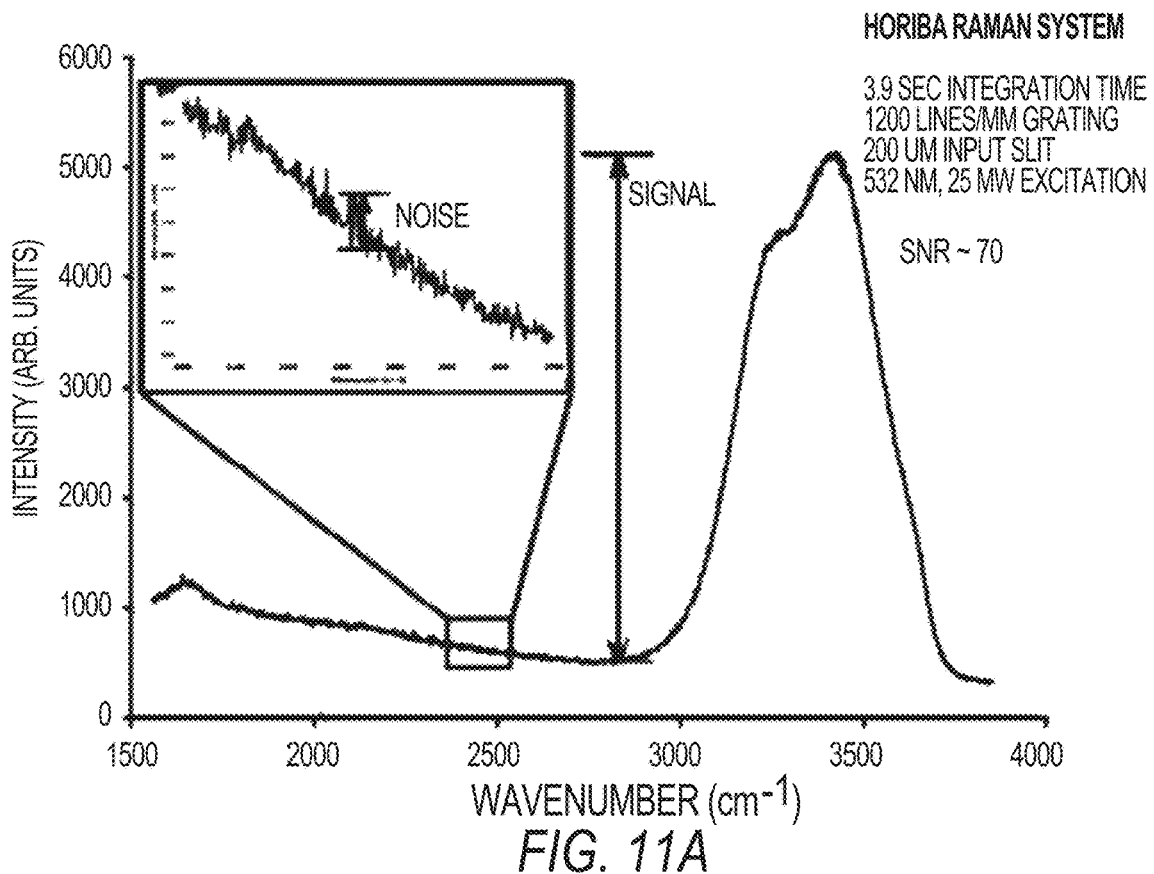
FIGS. 11A and 11B are intensity plots of example Raman spectra of distilled water measured with a high-end benchtop Raman spectrometer system and with a cell-phone-based Raman spectrometer system in accordance with one embodiment, respectively.
Figure 11B:
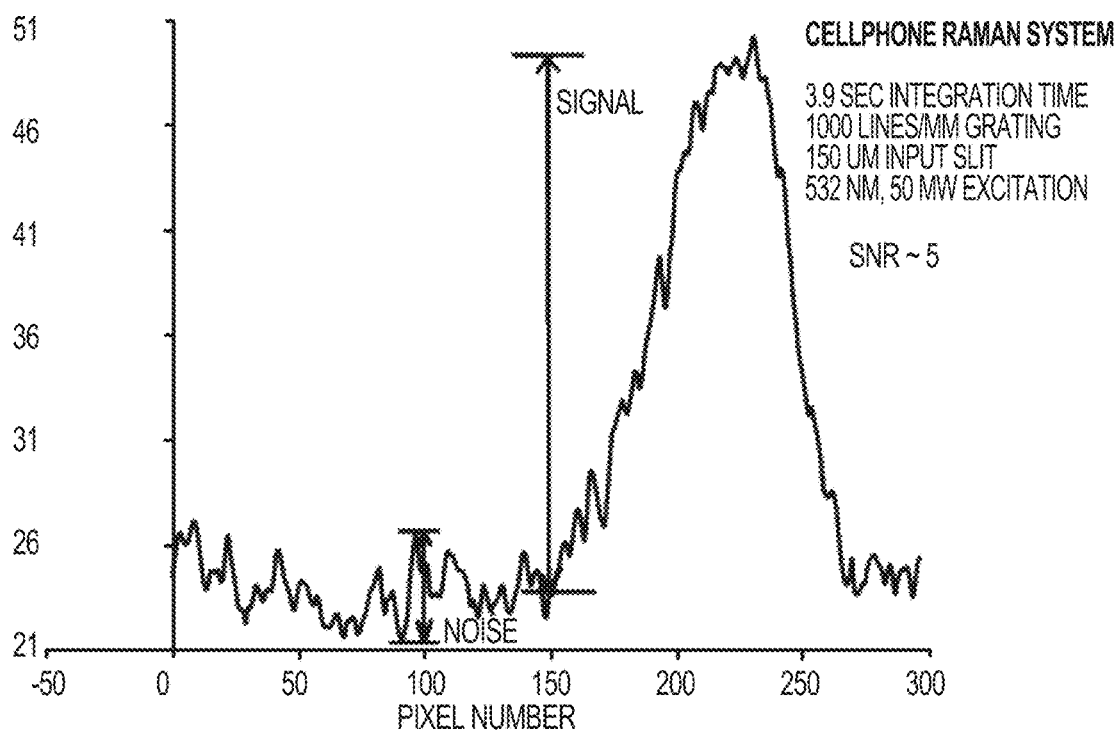

FIGS. 11A and 11B are example intensity plots of example Raman spectra of distilled water measured with a high-end benchtop Raman spectrometer system and with a cell-phone-based Raman spectrometer system in accordance with one embodiment, respectively. The benchtop Raman spectrometer system was HORIBA XploRA™, one of the most sensitive industrial Raman spectrometers. The integration time for both spectrometer systems was set at 3.9 s. The grating selected in the HORIBA Raman spectrometer system had a 1200 lines/mm groove density, and the transmission grating in the cell-phone-based Raman spectrometer had a groove density of 1000 lines/mm. The excitation wavelength of both spectrometer systems was 532 nm. The excitation power was 25 mW in the HORIBA Raman spectrometer system and 50 mW in the cell-phone-based Raman spectrometer system. The spectrometer input slit was 200 µm in the HORIBA Raman spectrometer system and 150 µm in the cell-phone-based Raman spectrometer system. The excitation numerical aperture (NA) was 0.25 for the HORIBA spectrometer system and nearly the same for the cell-phone-based Raman spectrometer system. Comparing the performance of the two systems, it can be seen that HORIBA spectrometer system has an SNR roughly one order of magnitude better than the cell-phone-based spectrometer system.

Figure 11C:
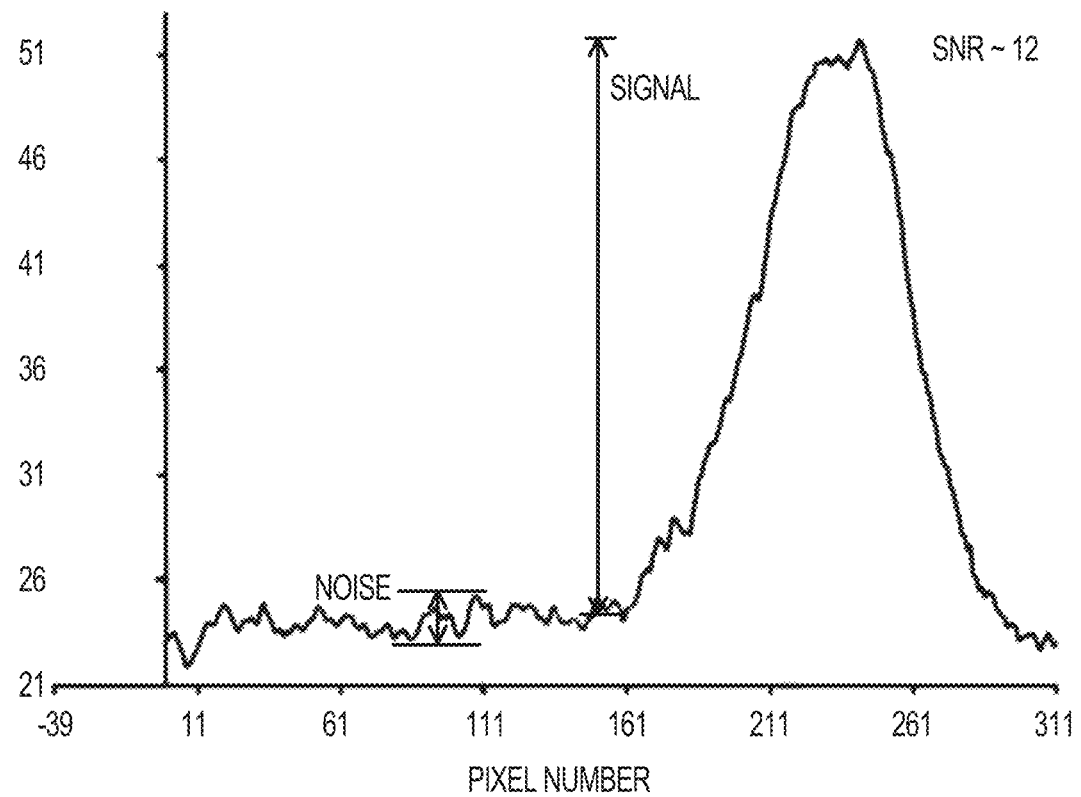
FIG. 11C is an intensity plot of an example Raman spectrum of distilled water measured with a cell-phone-based Raman spectrometer system in accordance with one embodiment when only a single RGB channel is used.

FIG. 11C is an example intensity plot of an example Raman spectrum of distilled water measured with a cell-phone-based Raman spectrometer system in accordance with one embodiment when only a single RGB channel is used. As can be seen, using only a single RGB channel, in the example the red (R) channel, improves the SNR of the cell-phone-based system nearly by a factor of 2. This is improvement is attributed to the fact that the Raman spectrum signal falls entirely in the red channel. Thus, the inclusion of other channels results in the addition of noise, but does not contribute to the Raman signal.

Even with only a single RGB channel being used in the cell-phone-based system, the HORIBA system still has substantially higher SNR. This difference is attributable, at least in part, to the large noise in the CCD/CMOS sensors of the cell-phone-based system as compared with the noise in the specialized CCD sensors of the HORIBA system and the relatively lower diffraction efficiency of the transmission grating used in the cell-phone-based system. The higher SNR of the HORIBA system comes, of course, with a significantly higher price tag, and for many applications, the performance of the cell-phone-based system is adequate. Moreover, and importantly, the benchtop HORIBA system lacks the portability that renders the cell-phone-based system suitable for many in-situ applications.

The data presented above demonstrates that cell-phone-based Raman spectrometer devices and systems as disclosed herein can successfully measure Raman spectra of chemical and biological molecules. Cell-phone-based Raman spectroscopy can be further improved by addressing several challenges presented by the use of a cell-phone camera as the spectroscopic sensor. One challenge is the rather limited dynamic range of the cell-phone-captured images (8-bit per color channel), which minimizes the simultaneous recording of strong and weak Raman lines. This problem can be overcome by using one of the several HDR (High Dynamic Range) camera applications that are available, which enhance the dynamic range of the captured images by combining multiple images at different exposures. Another challenge is due to the use of RGB Bayer filters, which may distort the intensity profile of smooth continua. To overcome this problem, the image may be converted, with an appropriate algorithm, to a monochrome image, which takes into account the spectral response of the individual Bayer filters.

The disclosed cell-phone-based Raman spectrometer devices and systems constitute a new, portable and inexpensive means for recording Raman, enhanced Raman, and other optical (e.g., fluorescence) spectra. By recording the Raman spectra of chemical and biological molecules, these devices provide a simple, reliable, and inexpensive method for the identification of impurities and pathogens (including, e.g., bacteria, viruses, and other disease-causing pathogens) in situ. The disclosed design simplifies the excitation and emission geometry of the device by reducing the number of optical components for recording Raman spectra, which may ease integration into modern cell-phone technology, with the potential for Raman spectroscopy to become an integral functionality of cell phones.

Although embodiments have been described with reference to specific example embodiments, it will be evident that various modifications and changes may be made to these embodiments without departing from the broader scope of the invention. Accordingly, the specification and drawings are to be regarded in an illustrative rather than a restrictive sense.

What is claimed is:

1. A handheld Raman spectrometer device comprising:
   a laser to emit an excitation beam towards a sample location, the excitation beam defining a first optical axis;
   collection optics defining a second optical axis intersecting the first optical axis at the sample location, wherein the second optical axis is perpendicular to the first optical axis, the collection optics to capture Raman-scattered light from a sample placed at the sample location;
   a diffraction grating positioned on the second optical axis to diffract the collected light along a third optical axis directly towards a camera of a cell phone, the camera comprising an objective lens and an image sensor; and
   a housing containing the laser, collection optics, and diffraction grating.

2. The device of claim 1, wherein the device is retrofitted to the cell phone, the cell phone being placed outside the housing and the housing comprising an opening along the third axis for exposure of the camera to the diffracted light.

3. The device of claim 1, wherein the device includes the cell phone, the cell phone having the laser, collection optics, and diffraction grating integrated therein, the cell phone being encased by the housing and the camera being placed inside the housing.

4. The device of claim 1, wherein the cell phone stores a software application to process Raman spectra recorded using the cell-phone camera.

5. The device of claim 1, further comprising a spectrometer aperture placed on the second optical axis between the collection optics and the diffraction grating, wherein the collection optics comprises a collecting lens to collimate the Raman-scattered light and a spectrometer coupling lens to focus the collimated light onto the spectrometer aperture.

6. The device of claim 5, further comprising a collimating lens placed on the second optical axis between the spectrometer aperture and the diffraction grating.

7. The device of claim 1, wherein the sample location is exterior to the housing.

8. The device of claim 1, wherein the sample location is interior to the housing, the housing further comprising a port to provide access to the sample location for placement of the sample at the sample location.

9. A method comprising:
   using a handheld device comprising a laser, collection optics, and a diffraction grating contained within a housing,
   illuminating a sample along a first optical axis with light emitted by the laser, capturing light Raman-scattered off the sample along a second optical axis with the collection optics, wherein the second optical axis is perpendicular to the first optical axis, and spectrally dispersing and diffracting the captured Raman-scattered light along a third optical axis with the diffraction grating to create a Raman spectrum; and recording the Raman spectrum with a camera of a cell phone placed along the third optical axis, the camera comprising an objective lens and an image sensor.

10. The method of claim 9, further comprising analyzing the Raman spectrum to determine Raman scattering wavelengths and identifying one or more analytes within the sample based on the Raman scattering wavelengths.

11. The method of claim 10, further comprising transmitting the Raman spectrum from the cell phone over a communications network to a remote computer to perform the analysis.

12. The method of claim 10, wherein the analysis is performed on the cell phone.

13. The method of claim 9, further comprising placing the cell-phone camera at an opening in the housing formed along the third optical axis to thereby expose the camera to the diffracted light to record the Raman spectrum.

14. The method of claim 9, wherein the handheld device includes the cell phone, the cell phone having the laser, collection optics, and diffraction grating integrated therein.

15. The method of claim 9, wherein the Raman-scattered light is collimated with a collecting lens and then focused onto a spectrometer aperture with a spectrometer coupling lens.

16. The method of claim 9, further comprising positioning the handheld device relative to the sample such that the sample is located at an intersection between the first and second directions.

17. The method of claim 9, further comprising placing the sample interior to the housing at an intersection between the first and second directions.

18. The method of claim 9, wherein recording the Raman spectrum with the camera of the cell phone comprises using the camera to capture multiple images of the Raman spectrum at different exposures and using a high-dynamic range (HDR) camera software application to combine the multiple images into a recorded Raman spectrum with enhanced dynamic range.

19. The method of claim 9, wherein the camera of the cell phone comprises RGB Bayer filters, and wherein recording the Raman spectrum with the camera of the cell phone comprises computationally converting an image of the Raman spectrum to a monochrome image, using an algorithm that takes into account the spectral response of the individual Bayer filters.

20. The method of claim 9, wherein the Raman spectrum is recorded using only a red RGB channel of the camera of the cell phone to increase a signal-to-noise (SNR) ratio.

* * * * *